United States Patent
Hazan et al.

(10) Patent No.: US 6,802,191 B2
(45) Date of Patent: Oct. 12, 2004

(54) CONTROLLED COLLAPSE OF DEPRESSED INDEX OPTICAL FIBER PREFORMS

(75) Inventors: Yoram De Hazan, Oley, PA (US); John Burnette MacChesney, Lebanon, NJ (US); Eric M. Monberg, Princeton, NJ (US); Thomas Edward Stockert, Millburn, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 355 days.

(21) Appl. No.: 09/837,983

(22) Filed: Apr. 19, 2001

(65) Prior Publication Data

US 2004/0172980 A1 Sep. 9, 2004

(51) Int. Cl.[7] .............................................. C03C 25/60
(52) U.S. Cl. .......................... 65/397; 65/399; 65/414; 65/415; 65/427
(58) Field of Search ......................... 65/397, 399, 413, 65/414, 415, 416, 427

(56) References Cited

U.S. PATENT DOCUMENTS 3,823,995 A  *  7/1974  Carpenter ................... 350/96
5,482,525 A  *  1/1996  Kajioka et al. ............... 65/398

FOREIGN PATENT DOCUMENTS

| JP | 61-31324 | * | 2/1986 |
| JP | 64-24041 | * | 1/1989 |
| JP | 7-157328 | * | 6/1995 |

* cited by examiner

*Primary Examiner*—Peter Chin (57) ABSTRACT

The doped silica core region of a core rod for an optical fiber preform is protected against unwanted fluorine doping during fluorine doping of the outer silica layer by selectively consolidating the core region prior to fluorine doping. Due to dopants in the core region, the soot in the core region consolidates before the soot in the outer undoped region. This inherent property allows the entire core rod to be heated prior to fluorine doping resulting in selective partial consolidation and preventing fluorine doping of the doped center core region. The process time required may be reduced by using incremental fluorine doping. In the incremental doping process the doping step is separated into a deposit step, where "excess" fluorine is deposited on the silica particles, and a drive-in step where atomic fluorine is distributed into the silica particles. The drive-in step is conveniently combined with the sintering or consolidation step to further enhance the efficiency of the doping process.

8 Claims, 5 Drawing Sheets

SiF₄ + He

CONTROLLED COLLAPSE OF DEPRESSED INDEX OPTICAL FIBER PREFORMS

FIELD OF THE INVENTION

This invention relates to methods for making depressed clad index optical fibers and is directed more specifically to techniques for preparing preforms prior to drawing optical fibers.

BACKGROUND OF THE INVENTION

Depressed clad optical fibers were developed in the early 1980's as an alternative to fibers with doped cores and less heavily doped, or undoped cladding. See, e.g., U.S. Pat. No. 4,439,007. Depressed cladding allows the use of fiber cores with relatively low doping. These cores provide low optical loss.

Applications have been developed for both single mode and multimode depressed clad fibers, and a variety of processes for the manufacture of depressed clad fibers were also developed. See e.g. U.S. Pat. No. 4,691,990, the disclosure of which is incorporated herein by reference. Complex refractive index profiles in optical fibers often use core regions of down doped silica.

Optical fibers with down doped regions have been found especially useful for lightwave systems in which control of non-linear effects is important. For example, in four-wave mixing of optical frequencies in the 1.5–1.6 mm wavelength region where DWDM networks operate, a low slope, low dispersion fiber is required. Recent advances in optical fiber technology have extended the DWDM range of operation to provide very high capacity transmission over a single fiber. Among these advances are fibers with nonzero-dispersion which are specifically designed to overcome pulse broadening and signal mixing in high power optically amplified DWDM systems over long distances. Current typical optically amplified DWDM systems operate in the 1530 to 1565 nm wavelength range, or the third window in the fiber spectrum. Emerging systems will use the fourth window (1565 to 1620 nm) to increase network capacity and optimize performance.

One of the important parameters in fiber designed for ultra high-speed networks is dispersion slope. Managing dispersion in the fiber itself reduces the need for high cost dispersion compensation components when used in high capacity WDM amplified systems.

Optical fibers for these and other advanced designs often require fiber cores with a down doped trench just outside the core region. These fibers have a modified W shaped index profile that has been found to be efficient for single mode guiding with low loss, and can be designed to have the dispersion characteristics mentioned above.

One technique for making depressed index regions in optical fiber preforms is to dope the region with fluorine or boron. In the case of a W shaped index fiber, the region of the core trench has a refractive index less than silica. In a preferred form, the center of the core is doped with, e.g. germania, to increase the index. In these structures, the $\Delta n$ is relatively large, e.g. 0.005–0.010, between the center of the core and trench. The $\Delta n$ between the trench and a silica cladding layer may be less than half that $\Delta n$ value.

In the manufacture of preforms for these fibers, one approach is to down dope the outer layer of a porous core rod (the shell) by "soaking" the core rod in a fluorine containing gas atmosphere with the core rod still in the porous state, i.e. prior to consolidation. The porosity of the core rod at this stage in the process allows the fluorine gas to easily permeate the germania doped silica body. The porosity is typically in the range of 50–90%, measured as volume of solids to volume of voids. The conventional practice is to diffuse fluorine into the silica body using an equilibrium doping process. In this process, the silica body is heated to a temperature of rapid diffusion, in the presence of a low partial pressure of fluorine, i.e. a partial pressure sufficient to supply a continuous flux of fluorine to maintain the equilibrium diffusion. However, recognizing that the center portion of the core requires a higher index and cannot therefore be down doped, it has been difficult to confine the doping process to the core rod "shell" in a controllable and predictable way. Fiber preforms with down doped core regions and a center region doped with a conventional index increasing dopant such as germania allow some latitude in the selective doping of the shell. One approach has been to dope the center of the core with an excess of germania, and down dope the entire core rod with fluorine. This produces a depressed index profile in the shell, but at added cost and with added optical loss in the core.

Another approach to selective down doping of the core rod shell has been described by Kanamori et al., in U.S. Pat. No. 5,055,121. This approach uses a solid core rod onto which a soot layer is formed. The porous soot layer can then be doped with $SiF_4$, which permeates the soot layer rapidly but diffuses slowly into the solid glass rod. In this way fluorine doping is confined to the shell region outside the core. This approach may be used for both down doping a shell region of a preform as well as for down doping a cladding of a preform. However, this approach is complex and expensive, requiring separate processing for the core rod, the shell, and the overcladding.

SUMMARY OF THE INVENTION

We have developed a fluorine doping process for optical fiber preforms with a "W" index profile that allows controlled doping of a porous silica core rod with fluorine but inhibits fluorine doping of the germania doped core. A key step in this process is a preliminary partial consolidation step wherein the germania core region is selectively consolidated prior to fluorine doping. The remainder of the core rod, still in a porous state, is doped with fluorine and then consolidated. The preliminary selective consolidation step protects the germania doped center region of the core rod from fluorine penetration. In a preferred embodiment of the invention, incremental fluorine doping is used. See U.S. patent application Ser. No. 09/755,914 filed Jan. 5, 2001. This fluorine doping process is relatively rapid, which further aids in preventing substantial fluorine doping of the center core region.

DETAILED DESCRIPTION

Figure 1A:
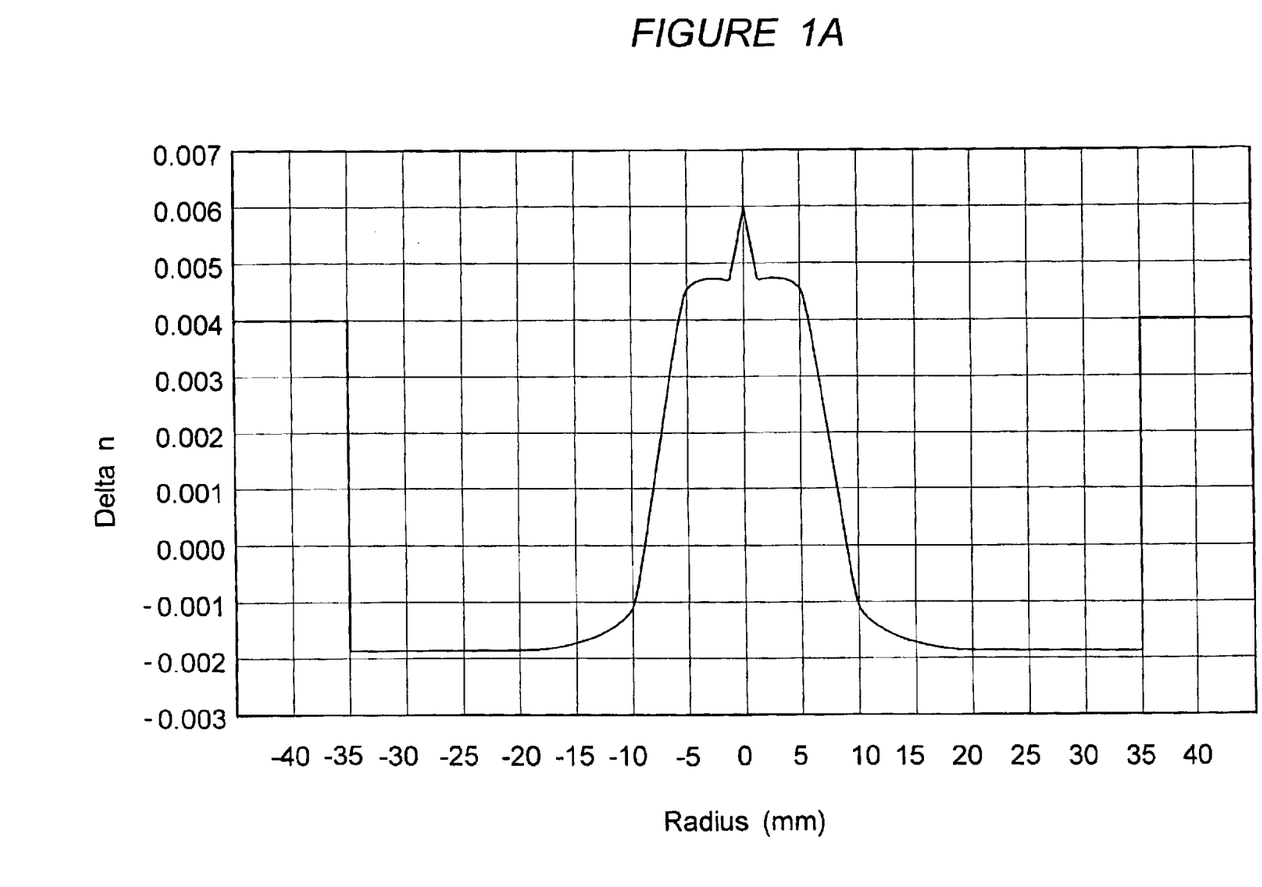
FIG. 1A is a refractive index profile for a W shaped index fiber that can be made using the process of the invention.
Figure 1B:
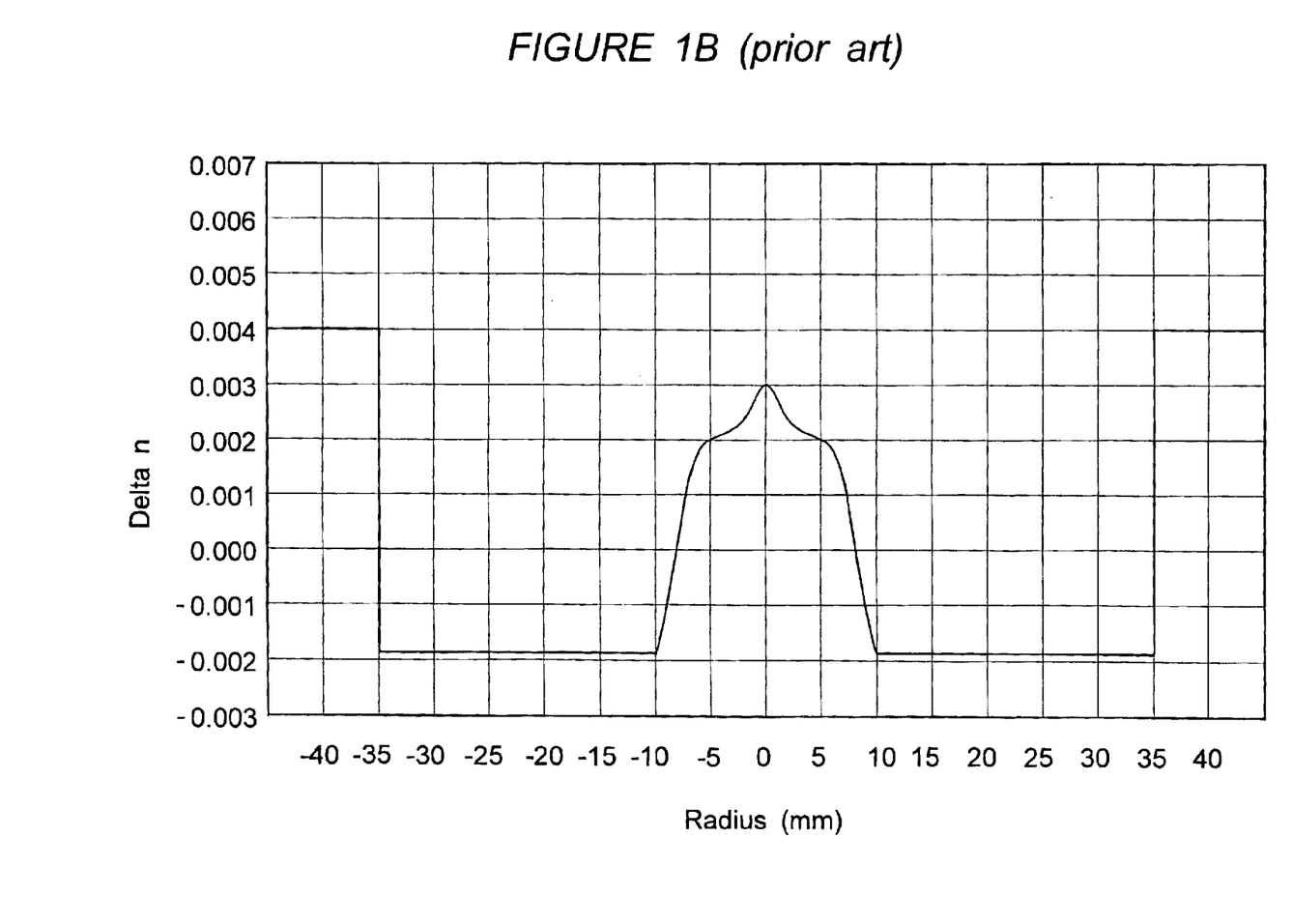
FIG. 1B is a refractive index profile for a soot body, identical to that used for FIG. 1A, but without pre-sintering before fluorine treatment.

FIG. 1A shows a typical refractive index profile for a W profile optical fiber of the kind to which the invention, in a principle embodiment, is directed. The center core region extends between radius −10 and +10. The depressed clad region extends from −10 to −35 and from +10 to +35. The silica clad region extends from −35 and +35 to the surface of the preform. The problem that is addressed by the invention is to dope the depressed core region of the initial core rod (the shell) without doping the center germania doped core region. The center core region, as seen, transitions between the fluorine doped depressed region and the up-doped center of the core. The center of the core is doped typically with germania. If fluorine penetrates to the center of the core during doping then the Δn will be lowered and the fiber properties compromised. The refractive index profile for a preform doped with fluorine in the manner of the invention, i.e. preserving the germania doped index change in the core, is illustrated by FIG. 1A. A refractive index profile for a preform doped by a prior art method, where the center core region is undesirably down-doped, is shown in FIG. 1B.

A process sequence for avoiding fluorine doping of the center of the core will be described in the context of an incremental fluorine doping process. It should be understood that the incremental doping process is a preferred embodiment of the invention, and that the expedient used to prevent fluorine doping of the center of the core can be practiced with other forms of fluorine doping, e.g., equilibrium doping. The feature that allows the objective of the invention to be realized is partial consolidation of the core prior to inhibit fluorine doping of the germania doped region. This feature can easily be implemented using any normal fluorine doping technique.

Likewise, the invention is described here in the context of a core rod and silica tube process. Other index profiles can be obtained using the process of the invention. For example, an up-doped core and a down-doped cladding may be produced using, e.g. a VAD process. The cladding may be down-doped minimizing the effect on the germania core region using the technique of the invention. Partial consolidation of the core region, practiced according to the invention, generally has an up-doped center core region as a prerequisite. The center core region may be doped with any dopant that produces a soot that consolidates at a lower temperature than the soot of the surrounding region. (IReference to soot in this context is intended to include porous glass material deposited by any known technique). In principle, any degree of doping of the center of the core will produce this condition, but it is preferred for the purpose of the invention, that the center of the core have a dopant concentration, in terms of germania, of at least 2 wt. %. In more general terms, it is prescribed that the dopant in the center of the core be sufficient to produce an index increase of at least 0.002 over that of pure silica.

Figure 2:
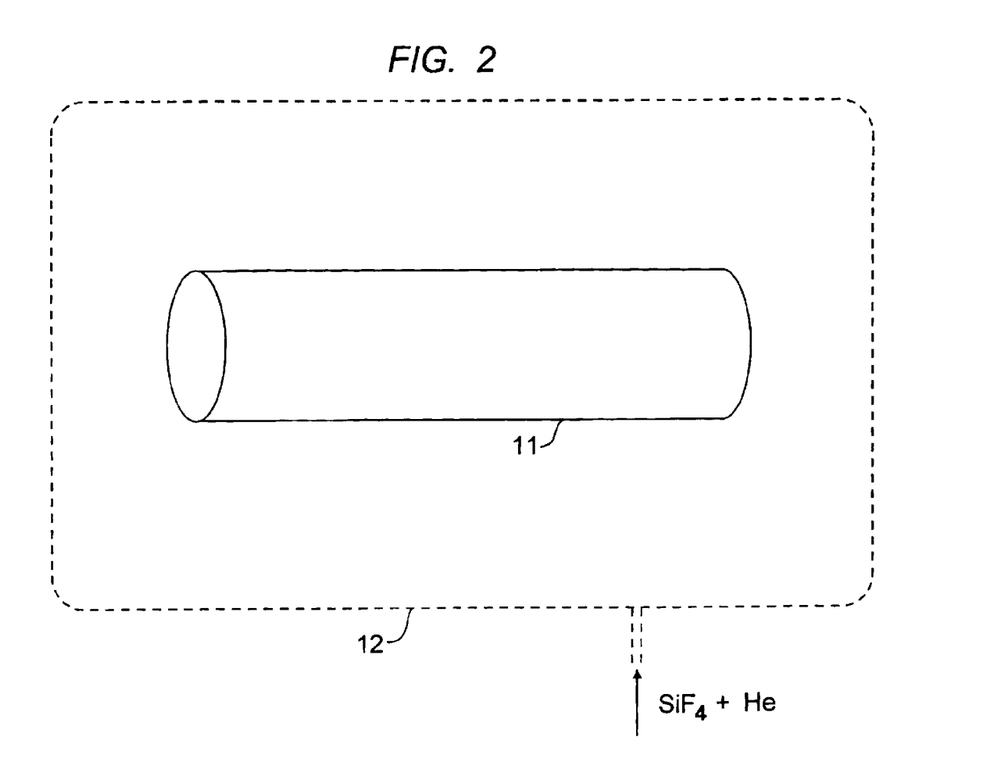
FIG. 2 is a representation of a porous core rod in a fluorine doping furnace.

The preferred process of the invention, i.e. incremental doping, will be described in conjunction with FIGS. 2–10. With reference to FIG. 2, a porous core rod 11, is shown prior to consolidation into a rod preform suitable for optical fiber manufacture. For consistency in nomenclature, and clear understanding of the invention, the term preform will refer to the final structure after consolidation or after assembly of the rod and tube (frequently referred to as jacketing), and collapse of the tube around the rod. The preform stage is the final fabrication stage of the glass prior to drawing the optical fiber. Where used, the term cladding tube refers to the glass tube into which the core glass rod is inserted to make a preform. In the context of core rods made by VAD or other equivalent process, the rod may be referred to as porous, i.e. prior to consolidation.

For convenience in describing the incremental doping process of the invention the example used in this description is a core rod made by a VAD process. The basic VAD process is well known and requires no detailed explanation here. For reference, see Optical Fibers: Materials and Fabrication by T. Izawa and S. Sudo, KTK Scientific publishers, Tokyo, 1978. It will be understood that the invention applies equally to the manufacture of optical fibers using preforms made by any suitable technique that results in a porous body with an up-doped center core region and a surrounding porous layer that is to be fluorine doped. Useful techniques may include VAD, CVD, MCVD, etc.

A porous VAD rod, suitable for making fiber with the desired profile, typically has a soot diameter of 100 to 400 mm. The VAD rod, after consolidation and shrinkage, will have dimensions represented by FIG. 1, i.e. a diameter in general of 50 to 200 mm and, as illustrated, approximately 70 mm. The core rod has a center core region doped typically with $GeO_2$ to a Δn ~0.003 or greater. While in the soot state, and prior to fluorine doping, the rod is heated to a temperature in the range 1150° C. to 1400° C. for a period of 5–240 minutes to partially consolidate the germania doped portion of the rod. The exact process conditions for partial consolidation will depend on several variables including the soot body dimensions, concentration of dopant in the core, and particle size. Complex index profiles may involve multiple doped layers, with a center region doped higher than surrounding regions. Here the suitable partial consolidation conditions will be determined by the concentration of dopant in the lowest An layer, as well as the core region. The partial consolidation conditions can easily be determined empirically by those skilled in the art. The process of the invention will be characterized by heating the prepared soot rod to a temperature of at least 1100° C. prior to fluorine doping, e.g. in the doping furnace but in an atmosphere essentially devoid of fluorine.

If the incremental doping process is used, according to a preferred embodiment of the invention, then the process will be characterized by a preliminary heating step in the absence of fluorine to partially consolidate the core part of the soot body, a heating step in a fluorine atmosphere, and a final heating step without fluorine for the drive-in/consolidation step characteristic of the incremental doping process. The latter will be described in more detail below.

Figure 3:
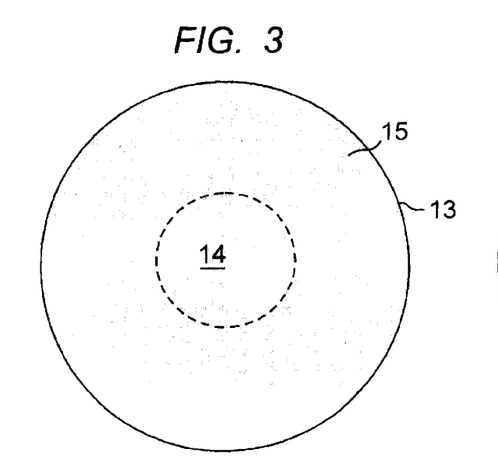
FIGS. 3 and 4 are schematic views of a section through a soot body before (FIG. 3) and after (FIG. 4) partial consolidation of the soot body according to the invention.
Figure 4:
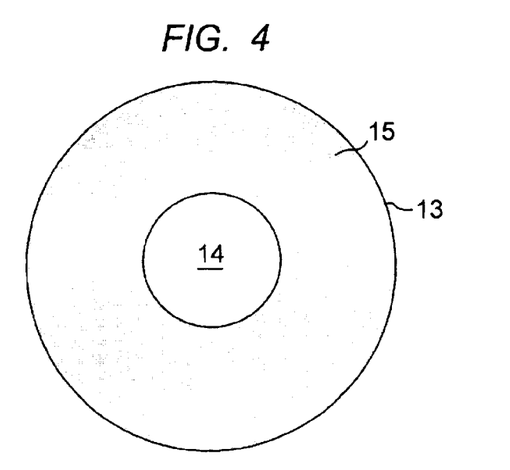

The soot body is shown prior to partial consolidation in FIG. 3. The soot body is designated 13, with a germania doped center core region 14, and undoped (or lower doped) silica surrounding region 15. The soot body is shown after partial consolidation in FIG. 4, where the germania doped center core region 14 has been densified, lowering the porosity and surface area, leaving a surrounding layer 15 of undoped silica soot that remains unconsolidated. The surrounding soot region 15 remains porous and susceptible to rapid penetration by fluorine during subsequent fluorine doping.

Following the partial consolidation step, just described, the soot body is treated in a fluorine gas atmosphere to provide the fluorine dopant for the outer (porous shell) region of the partially consolidated body. This step is illustrated in FIG. 2 where the porous body 11 is shown schematically being treated in furnace 12. As mentioned, the fluorine doping step will be described as an incremental doping process. For comparison, the description begins with a brief explanation of the standard equilibrium doping process. The usual fluorine source is $SiF_4$ with a carrier gas such as nitrogen, argon or helium. The furnace atmosphere is heated to a temperature in the range 500–1200° C. for this step. Molecular $SiF_4$ permeates into the outside of the porous body and rapidly penetrates the entire rod. At the same time, diffusion of atomic fluorine begins at the particle level. This effect is termed diffusion to define doping of the individual silica particles with elemental fluorine. The diffusion front proceeds from the surface of the particle, which is exposed to the fluorine atmosphere, to the center of the particle. It is recognized that the diffusion in the equilibrium doping process is inherently slow. The $\Delta n$ is proportional to the $SiF_4$ partial pressure to the quarter power:

$$\Delta n \sim P^{1/4} \qquad (1)$$

Figure 5:
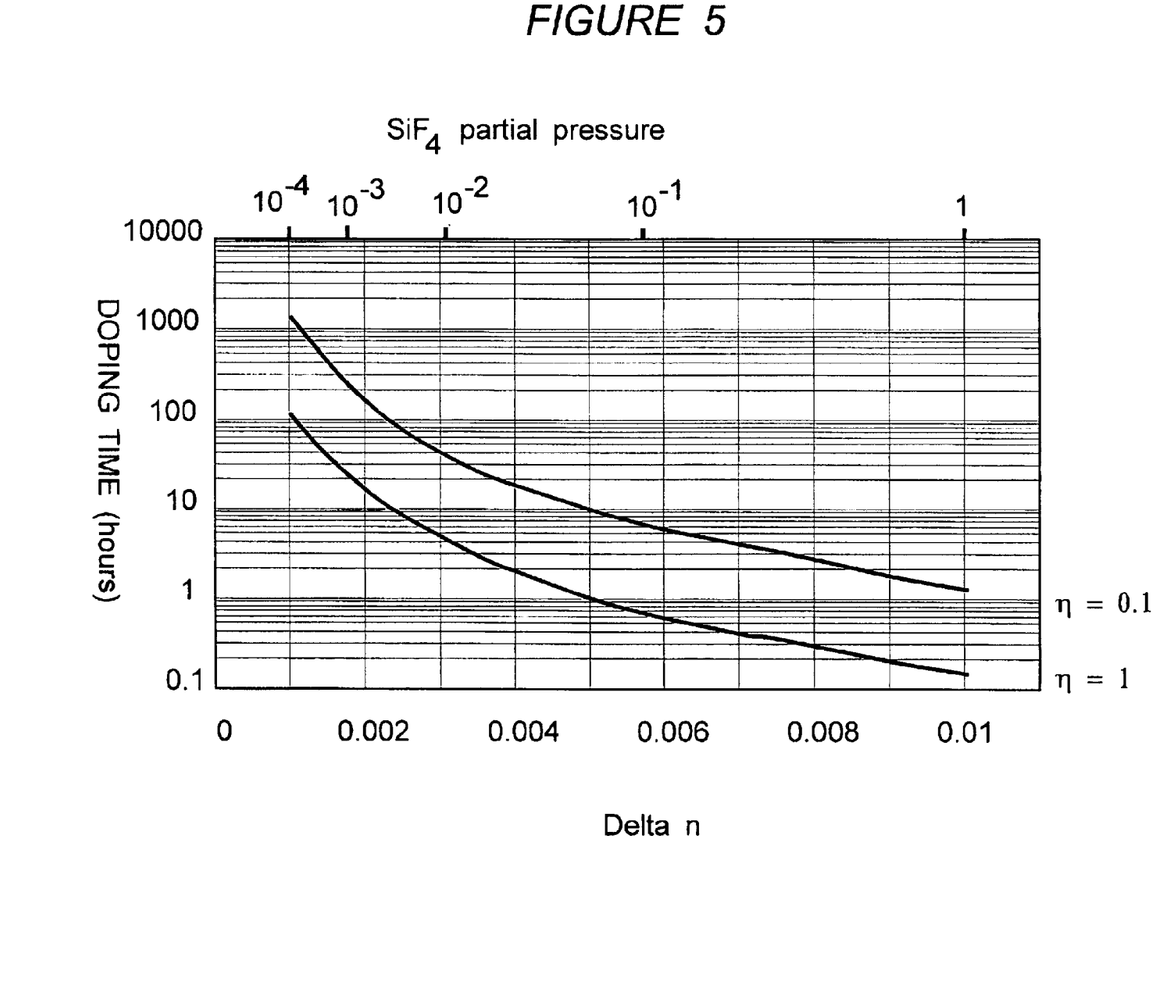
FIG. 5 is a plot of doping time vs. refractive index change for equilibrium doping processes.

The equilibrium partial pressures of $SiF_4$ corresponding to doping levels of $\Delta n=0.001-0.003$ are $1 \times 10^{-4}-8.0 + 10^{-3}$, respectively. The doping of large porous bodies at intermediate and high $SiF_4$ partial pressures is generally limited by mass transport in and into the porous body. However, in the low partial pressure regime used in equilibrium doping, the rate of $SiF_4$ introduction into the reaction vessel becomes the rate limiting step. Recently, the refractive index variation was found to be linearly related to the weight of $SiF_4$ incorporated. This can be used to estimate the dependence of the doping time scale on the $SiF_4$ partial pressure under this limiting condition. The doping time scale, $t_D$, can be defined by the ratio of the desired $\Delta n$ times the body mass divided by the $SiF_4$ partial pressure, $SiF_4$ mass, and the total flow, corrected by a doping efficiency, $\eta$, which is the fraction of $SiF_4$ incorporated in the sample to the total amount supplied. In terms of the total molar flow into the reactor, F, sample weight, W, and refractive index variation $\Delta n$, the doping time scale, $t_D$, is given by:

$$t_D \alpha (\Delta n W)/PFM)(1/\eta) \sim K\Delta n/\Delta n^4(1/\eta) \sim K\Delta n^{-3}(1/\eta); K \sim W/(FM) \qquad (2)$$

where M and P are the molecular weight of $SiF_4$ and the partial pressure, respectively. The second step in the development of equation 2 uses the relationship from equation 1 ($\Delta n \sim P^{1/4}$). Equation 2 shows that for a given sample size and $SiF_4$ flow rate, the doping time scale to is proportional to $\Delta n^{-3}$. This is illustrated in FIG. 5. This example assumes 10 kg sample and 10 liters/min total volumetric flow. For the same doping efficiency, an order of magnitude decrease in $\Delta n$ results in an increase in doping time by three orders of magnitude. Doping times of 5 and 130 hours are expected for $\Delta n$ values of 0.003 and 0.001, respectively at 100% efficiency. Realistically, these doping times are predicted to be an order of magnitude longer due to lower doping efficiencies. In practical terms, increasing the flow rate may not decrease doping times proportionally since this would result in an efficiency penalty due to the decrease in retention time of the gas dopant. Decreasing sample size may also reduce efficiency and, more importantly, compromises throughput. At the higher $\Delta n$ values of FIG. 5, the predicted doping times due to introduction rates are very short. Thus the doping process in this regime is expected to be limited by diffusion in the porous body, further decreasing doping efficiencies. However, at the low doping levels, $\Delta n=0.001-0.003$, the doping process clearly becomes very time consuming due to the low rate of $SiF_4$ introduction into the reaction vessel.

To overcome the slow processing rates characteristic of equilibrium doping processes a fundamentally different doping approach is used. A high $SiF_4$ partial pressure, well above the equilibrium partial pressure, is used to deposit excess fluorine as a surface layer on the particles of the porous body. In some cases, this deposition step may be carried out at a temperature below the effective diffusion temperature for practical distribution of fluorine throughout the silica particles, i.e. 1000° C. or below. A range of 800–1000° C. is recommended although a wider range of 500–1100° C. may be found useful in some cases. The fluorine deposits on the particle surface mainly by molecular absorption, which is essentially instantaneous compared with the time required for fluorine to penetrate substantially into the particle by atomic diffusion. Thus the total amount of fluorine required for the index modification of the preform is deposited as a concentrated surface layer in a relatively short doping step. This deposition of excess fluorine on the surface of the particles of the porous body is the first stage of the incremental doping process. Thereafter, the porous body is removed from the fluorine doping atmosphere (or decreased to equilibrium) and is exposed to a high temperature drive-in step to distribute the excess fluorine, as deposited, uniformly throughout the porous silica body. This drive-in step, the second stage of the incremental doping process, may be combined with the consolidation step of the process for further savings in process time.

Figure 6:
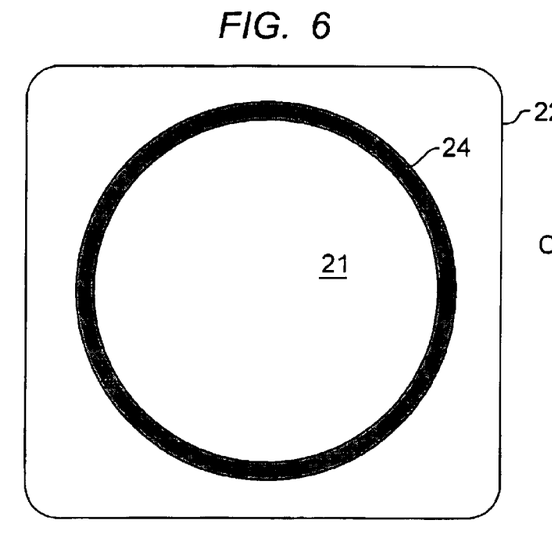
FIG. 6 is a schematic view of a section through a silica particle treated by the incremental doping process of the invention showing the dopant distribution after the deposit step.

The incremental doping process of the invention is illustrated in FIGS. 6–9. FIG. 6 shows an individual silica particle 21 of a porous silica body being treated in a fluorine atmosphere. The deposited region 24 on the outside of the particle 21 is a region containing a high concentration of fluorine adsorbed on the surface of the particle. The concentration of fluorine in this surface layer is approximately in equilibrium with the atmosphere in furnace 22. The partial pressure of fluorine can be adjusted as desired but is preferably at least 5 times the equilibrium partial pressure corresponding to the final doping level for the entire preform. This high partial pressure will depend on the $\Delta n$ desired but will typically be greater than 1%. Using $SiF_4$ as the fluorine source, the deposition atmosphere in general will contain $SiF_4$ in the range of 1–100%.

The temperature of the deposition may vary widely, and in an ideal process depends in part on the porosity of the silica body. For very porous structures the $SiF_4$ permeation of the porous body may proceed rapidly, and temperatures up to 1200° C. may be used. For example, VAD soots characteristically have porosity levels of 80% or greater. VAD core rods 15 cm. in diameter can be uniformly doped to an incremental amount, $\Delta n \sim 0.002$, in approximately 10 minutes at 1000° C. For less porous structures, the permeation process is typically longer, and premature consolidation should be avoided during this step. At the low end of the temperature range, e.g. 500° C., the deposition process is slower. This end of the range is useful for producing small $\Delta n$ preforms with a relatively high degree of control, i.e. the doping concentration level varies more slowly and controllably with time. This temperature dependence feature adds another dimension of control to the process. The final doping level of the preform can be controlled by adjusting the deposition temperature. In the equilibrium doping process, the doping level is controlled mainly by partial pressure of fluorine. The deposition step proceeds to completion in a period typically in the range of 10–240 minutes.

The preferred temperature range for the deposition step, to avoid any possibility of premature consolidation, is less than 1050° C. For the $\Delta n$ values of most interest for doping core regions, i.e. relatively small $\Delta n$ values, deposition temperatures of 1000° C. or less allow for a desired level of control.

Figure 7:
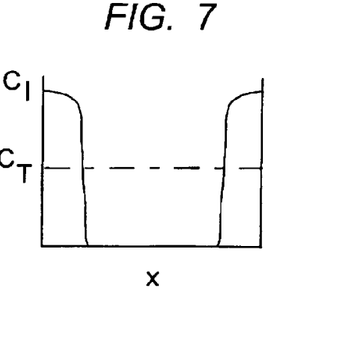
FIG. 7 is a representative plot of dopant concentration vs. distance for the particle of FIG. 6.

The concentration of fluorine in the particle 21 of FIG. 6 is shown schematically in FIG. 7 with axis x representing the diameter of the particle. The exterior region of the particle has a very high concentration of fluorine, i.e. well above the target concentration $C_T$. In the preferred case, the concentration of fluorine at the particle surface $C_f$, will be at least ten times $C_T$.

Figure 8:
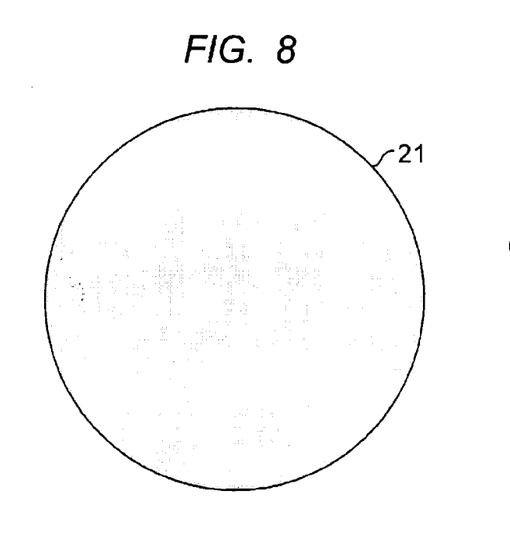
FIG. 8 is a schematic view of a section the particle of FIG. 6 showing the impurity distribution after the drive-in step.
Figure 9:
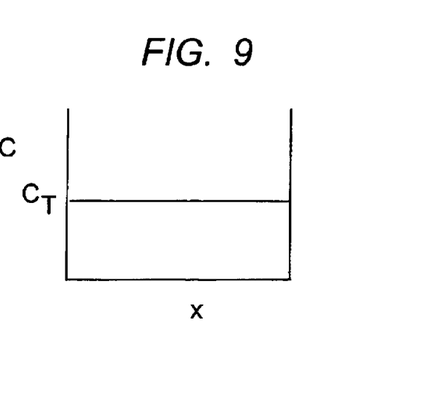
FIG. 9 is a representative plot of dopant concentration vs. distance through the particle of FIG. 6.

The drive-in or diffusion step is illustrated by FIGS. 8 and 9. The silica particle 21 in FIG. 8 is shown after drive-in with a uniform distribution of fluorine throughout the particle. The fluorine concentration profile for particle 21 is shown in FIG. 9, with uniform concentration $C_T$.

The drive-in step is preferably combined with the sintering step and is conducted at temperatures in the range 1300–1600° C. Alternatively, the porous silica body may be treated at a temperature of 1200–1400° C. for drive-in, then sintered. The process time required for the drive-in/sintering step will vary depending on the size and geometry of the preform and the temperature used, but will typically be in the range 30–500 minutes. The overall process time, for both deposit and drive-in/consolidation, may be less than an hour. This represents a dramatic reduction in process time as compared with prior methods of preparing fluorine doped preforms.

The sintered perform is then used for drawing optical fiber in the conventional way using an optical fiber drawing apparatus with a furnace used to soften the glass preform and initiate fiber draw. The nascent fiber surface is then passed through a coating cup, which has a chamber containing a coating prepolymer. The liquid coated fiber from the coating chamber exits through a die. The combination of the die and the fluid dynamics of the prepolymer, controls the coating thickness. The prepolymer coated fiber is then exposed to UV lamps to cure the prepolymer and complete the coating process. Other curing radiation may be used where appropriate. The fiber, with the coating cured, is then taken up by take-up reel. The take-up reel controls the draw speed of the fiber. Draw speeds in the range typically of 1–20 m/sec. can be used. It is important that the fiber be centered within the coating cup, and particularly within the exit die, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer controls the take-up reel.

Coating materials for optical fiber are typically urethanes, acrylates, or urethane-acrylates, with a UV photoinitiator added. The apparatus may have a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylic. In commercial practice both materials may be low and high modulus acrylates. The coating thickness typically ranges from 150–300 $\mu$m in diameter, with approximately 240 $\mu$m standard.

The following examples are given to illustrate the invention.

EXAMPLE 1

A porous silica core rod, 150 mm in diameter, with a core center doped with germania to $\Delta n \sim 0.005$ is heated to 1100° C., dehydrated with chlorine, and purged with He. The core rod is then cooled to 1000° C., and treated for 30 minutes in 10% $SiF_4$+He, to deposit $SiF_4$ on the particles of the porous body. The porous body is then heated in helium to 1500° C. and sintered for 1 hour to consolidate the entire body.

In this sample the clad has the desired index of approximately $-0.002$ $\Delta n$ but the core has also been fluorine doped lowering the refractive index to +0.002. The refractive index profile for this case is shown in FIG. 1B. This result is undesirable since the effect of the fluorine is to compensate or erase the effect of the germania dopant. Efforts to counteract the compensation effect by increasing the initial germania doping level are only partially successful since the increased overall doping of the core increases the light absorption (loss) in the core.

EXAMPLE 2

A porous VAD core rod with a core center doped with germania to $\Delta n \sim 0.005$ is heated in stages in He to 1100° C. in 7 hours, then dehydrated at that temperature with He/10% chlorine. The body is then partially consolidated by heating at 1275° C. for 2 hours. This treatment selectively consolidates the germania doped core but leaves the remainder of the rod in a porous state. After cooling to 1000° C., it is treated in He/10% $SiF_4$ for 30 minutes to deposit fluorine on the surface of the particles. The deposited porous body is then heated to 1550° C. for drive-in/consolidation. The finished rod has a $\Delta n$ of approximately 0.005 in the core region, which is preserved from the $\Delta n$ value prior to fluorine doping, and a $\Delta n^-$ in the outer fluorine doped region (shell) of the core rod of approximately 0.002. The refractive index profile for this result is shown in FIG. 1A. As will be appreciated by those skilled in the art, this $\Delta n$ was obtained using a $SiF_4$ treatment of 30 minutes, which compares favorably with the conventional equilibrium doping process in which treatment at the equilibrium partial pressure of $SiF_4$ of $2 \times 10^{-3}$ atmospheres requires 20 hours (assuming 100% efficiency, not typical in a production process).

In the foregoing description, the source of fluorine is $SiF_4$. As evident to those skilled in the art, other sources of fluorine may be used. For example, $SiHF_3$, $SiH_2F_2$, $SF_6$, $CF_4$, may also be suitable. These will result in index depression equivalent to that produced by $SiF_4$. However, instead of contending with $SiF_4$ as low as $10^{-9}$ atmospheres, low temperature F$^-$doping can be regulated to provide the desired index depression at $SiF_4$ partial pressures above 1% and typically 10% or more. As indicated earlier, the fluorine deposits on the individual particles as primarily a molecular species. The drive-in mechanism primarily involves diffusion of atomic fluorine. To amplify this important distinction, the deposition step is described as involving deposition of fluorine on the particle surface, and the drive-in as diffusion of fluorine.

The examples given above use germania as the core dopant but, as mentioned earlier, other dopant materials may be used to increase the refractive index in the core. These are referred to here categorically as up-dopants or materials that produce an up-doped region in the center of the core. Likewise, other down dopants (other than fluorine) may be found useful for the outer shell layer of the core. These materials are categorized generically as producing a "down-doped" region. Core rods to be treated according to the invention will have, in general, an up-doped center core region and a lower doped surrounding shell region. It is intended that the "lower" doped surrounding region includes the case where the surrounding region is undoped.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. Process for the manufacture of optical fibers comprising:

preparing an optical fiber preform, heating the preform to the softening temperature, and drawing an optical fiber from the optical fiber preform wherein the optical fiber preform is produced by steps including:

(i) preparing a porous silica body of silica particles, the porous silica body having an inner up-doped region surrounded by an outer shell region, said outer shell region comprising a lower doped region, (ii) heating the porous silica body to a temperature of at least 1100° C. in the absence of fluorine for a period sufficient to selectively consolidate the inner up-doped region, (iii) heating the porous silica body in an atmosphere of a fluorine compound to produce a fluorine doped preform region with a refractive index change $\Delta n$, the atmosphere having a partial pressure of fluorine compound that is at least five times greater than the equilibrium partial pressure p expressed by $\Delta n \sim p^{1/4}$ and a temperature maintained below 1050° C., (iv) reducing the fluorine concentration, and (v) heating the porous silica body at a temperature greater than 1300° C., to complete consolidation of the porous silica body.

2. The process of claim 1 wherein the fluorine atmosphere comprises $SiF_4$.

3. The process of claim 2 wherein the fluorine atmosphere is greater than 10% $SiF_4$.

4. The process of claim 1 wherein the outer shell region is undoped silica.

5. The process of claim 1 wherein the inner core region is doped with germania.

6. The process of claim 5 wherein the inner core region is doped to a $\Delta n$ in the range 0.001–0.058.

7. The method of claim 1 wherein in step (iv) the fluorine concentration is reduced to essentially zero.

8. Process for the manufacture of an optical fiber preform, comprising:

(i) preparing a porous silica body of silica particles, the porous silica body having an inner up-doped region surrounded by an outer shell region, said outer shell region comprising a lower doped region, (ii) heating the porous silica body to a temperature of at least 1100° C. in the absence of fluorine for a period sufficient to selectively consolidate the inner up-doped region, (iii) heating the porous silica body in an atmosphere of a fluorine compound to produce a fluorine doped preform region with a refractive index change $\Delta n$, the atmosphere having a partial pressure of fluorine compound that is at least five times greater than the equilibrium partial pressure p expressed by $\Delta n \sim p^{1/4}$ and a temperature maintained below 1050° C., (iv) reducing the fluorine concentration, and (v) heating the porous silica body at a temperature greater than 1300° C., to complete consolidation of the porous silica body.

* * * * *